(12) United States Patent
McCauley

(10) Patent No.: US 11,069,518 B2
(45) Date of Patent: Jul. 20, 2021

(54) MULTILAYER INSULATION FOR MASS SPECTROMETRY APPLICATIONS

(71) Applicant: Thermo Finnigan LLC, San Jose, CA (US)

(72) Inventor: Edward B. McCauley, Cedar Park, TX (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 16/587,585

(22) Filed: Sep. 30, 2019

(65) Prior Publication Data

US 2021/0098246 A1 Apr. 1, 2021

(51) Int. Cl.
*H01J 49/24* (2006.01)
*B32B 7/05* (2019.01)

(52) U.S. Cl.
CPC ............... *H01J 49/24* (2013.01); *B32B 7/05* (2019.01); *B32B 2307/304* (2013.01); *B32B 2457/00* (2013.01)

(58) Field of Classification Search
USPC ....................................................... 250/288
See application file for complete search history.

(56) References Cited

U.S. PATENT DOCUMENTS

| 4,641,541 | A | * | 2/1987 | Sharp | ................ | G01N 30/7206 |
| | | | | | | 250/288 |
| 6,617,768 | B1 | | 9/2003 | Hansen | | |
| 6,891,157 | B2 | | 5/2005 | Bateman et al. | | |
| 7,189,977 | B2 | | 3/2007 | Yamaguchi et al. | | |
| 7,608,818 | B2 | * | 10/2009 | Miller | ................ | G01N 27/624 |
| | | | | | | 250/281 |
| 8,039,795 | B2 | | 10/2011 | Mordehai et al. | | |
| 8,234,835 | B2 | | 8/2012 | Dye et al. | | |
| 8,330,101 | B2 | * | 12/2012 | Seyfarth | ............... | H01J 49/107 |
| | | | | | | 250/288 |
| 2014/0263999 | A1 | | 9/2014 | Ramsey | | |

FOREIGN PATENT DOCUMENTS

| EP | 0410341 A2 | 1/1991 |
| EP | 3364447 A1 | 8/2018 |
| WO | WO2007078573 A2 | 7/2007 |

OTHER PUBLICATIONS

Sutheesh et. al., "Thermal performance of multilayer insulation: A review", IOP Conf. Series: Materials Science and Engineering 396, 2018, pp. 1-8 (Year: 2018).*

Jacob et al., "Investigations into the thermal performance of multilayer insulation (300-77 K)—Part 1: Calorimetric studies", Cryogenics 1992 vol. 32, No. 12, pp. 1137-1146.

Kemper et al., "A new, higher resolution, ion mobility mass spectrometer", International Journal of Mass Spectrometry 287 (2009), pp. 46-57.

Donabedian, Gilmore et al., "Insulation". Spacecraft Thermal Control Handbook—vol. 1: Fundamental Technologies. 2nd Edition. American Institute of Aeronautics and Astronautics, Inc., (2002), Chapter 5, pp. 161-205.

* cited by examiner

*Primary Examiner* — Phillip A Johnston
(74) *Attorney, Agent, or Firm* — David A. Schell

(57) ABSTRACT

A mass spectrometer includes a vacuum manifold having an interior space, a vacuum pump configured to maintain the interior space at a pressure below 5×10-5 torr, a heated component, such as an ion source, located within the interior space, and a multilayer insulator located within the interior space. The multilayer insulator including an inner layer with a first surface oriented towards the heated component and a second surface oriented away from the heated component; and an outer layer with a third surface oriented towards away from the heated component and a fourth surface oriented towards the heated component.

20 Claims, 7 Drawing Sheets

MULTILAYER INSULATION FOR MASS SPECTROMETRY APPLICATIONS

FIELD

The present disclosure generally relates to the field of mass spectrometry including multilayer insulation.

INTRODUCTION

Mass spectrometry can be a useful technique for identifying and quantifying components in a sample. Generally, components of a sample are ionized, such as by electron impact ionization (EI), chemical ionization (CI), thermal ionization, and the like. The ions can then be manipulated through various electrical and magnetic fields using various devices such as ion lenses, quadrupoles, ion traps, and the like. Ultimately, the ions can be detected using a detector. Correlation between the manipulations and the detection of ions can be used to identify the ion, and the intensity of the signal produced by the detector can be used to quantitate the ions.

To minimize impacts between the ions and neutral gas molecules which can fragment or scatter the ions, the manipulations and detection of the ions are performed under vacuum. In some cases, the ionization of the sample can also be performed under vacuum. As such, the various components may be housed in a vacuum chamber. Additionally, the temperature of components, such as an ion source or a quadrupole, can affect the performance of the mass spectrometer. Additionally, the optimal temperature of the various components can be different, with some components needing to be heated while other components need to remain relatively cool.

BACKGROUND

Mass spectrometers are becoming increasingly complex devices with more and more temperature sensitive components being located in the vacuum environment. Such components may include polymers such as flex print circuits, O-rings, circuit boards and the like. Location of these parts within the vacuum envelope precludes cooling them by conventional means such as forced air cooling or convection and exposes these parts to potential infrared heating. Excessive heating may cause undesirable outgassing or complete component failure. Since the mechanisms of heat transfer are limited in such situations, it is difficult if not impossible to locate such components in the vacuum envelope without improved thermal isolation.

From the foregoing it will be appreciated that a need exists for improved methods to thermally isolate components within the vacuum chamber.

SUMMARY

In a first aspect, a mass spectrometer can include a vacuum manifold having an interior space; a vacuum pump configured to maintain the interior space at a pressure below 5×10-5 torr; an ion source located within the interior space and configured to ionize a sample; and a multilayer insulator located within the interior space. The ion source can include a heating element to maintain the ion source at an elevated temperature. The multilayer insulator can include an inner layer with a first surface oriented towards the ion source and a second surface oriented away from the ion source; and an outer layer with a third surface oriented towards the ion source and a fourth surface oriented away from the ion source. The inner layer and the outer layer can be displaced apart from one another.

In various embodiments of the first aspect, the multilayer insulator can further include one or more spacers separating the inner layer and the outer layer.

In Particular Embodiments, the Spacers can Include

In various embodiments of the first aspect, the multilayer insulator can further include one or more interior layers between the inner layer and the outer layer and displaced apart from one another and the inner and outer layers. In particular embodiments, the multilayer insulator can further include a plurality of spacers separating the inner layer, the outer layer and the one or more interior layers.

In various embodiments of the first aspect, the first surface can have a low emissivity.

In various embodiments of the first aspect, the fourth surface can have a low emissivity.

In various embodiments of the first aspect, the mass spectrometer can further include a temperature sensitive component separated from the ion source by the multilayer insulator, wherein the fourth surface can be oriented towards the temperature sensitive component.

In various embodiments of the first aspect, the temperature sensitive component can include a printed circuit board.

In a second aspect, a mass spectrometer can include a vacuum manifold having an interior space; a vacuum pump configured to maintain the interior space at a pressure below 5×10-5 torr; a heated component located within the interior space; and a multilayer insulator located within the interior space. The multilayer insulator can include an inner layer with a first surface oriented towards the ion source and a second surface oriented away from the heated component; and an outer layer with a third surface oriented towards the heated component and a fourth surface oriented towards an interior surface of the vacuum manifold or other heat sink. The inner layer and the outer layer can be displaced apart from one another.

In various embodiments of the second aspect, the multilayer insulator can further include one or more spacers separating the inner layer and the outer layer.

In various embodiments of the second aspect, the multilayer insulator can further include one or more interior layers between the inner layer and the outer layer and displaced apart from one another and the inner and outer layers. In particular embodiments, the multilayer insulator can further include a plurality of spacers separating the inner layer, the outer layer and the one or more interior layers.

In various embodiments of the second aspect, the first surface can have a low emissivity.

In various embodiments of the second aspect, the fourth surface can have a low emissivity.

In various embodiments of the second aspect, the heated component can include an ion source, an ion guide, or an ion transfer tube.

In a third aspect, a mass spectrometer can include a vacuum manifold having an interior space; a vacuum pump configured to maintain the interior space at a pressure below 5×10-5 torr; a heated component located within the interior space; a temperature sensitive component located within the interior space and separated from the heated component by a vacuum; and a multilayer insulator located between the heated component and the temperature sensitive component. The multilayer insulator can include an inner layer with a first surface oriented towards the heated component and a second surface oriented towards the temperature sensitive component, and an outer layer with a third surface oriented towards the heated component component and a fourth surface oriented towards the temperature sensitive component. The inner layer and the outer layer can be displaced apart from one another.

In various embodiments of the third aspect, the multilayer insulator can further include one or more spacers separating the inner layer and the outer layer.

In various embodiments of the third aspect, the multilayer insulator can further include one or more interior layers between the inner layer and the outer layer and displaced apart from one another and the inner and outer layers. In particular embodiments, the multilayer insulator can further include a plurality of spacers separating the inner layer, the outer layer and the one or more interior layers.

In various embodiments of the third aspect, the first surface can have a low emissivity.

In various embodiments of the third aspect, the fourth surface can have a low emissivity.

In various embodiments of the third aspect, the temperature sensitive component can include a printed circuit board.

In various embodiments of the third aspect, the heated component can include an ion source, an ion guide, or an ion transfer tube.

DRAWINGS

For a more complete understanding of the principles disclosed herein, and the advantages thereof, reference is now made to the following descriptions taken in conjunction with the accompanying drawings, in which.

Figure 1:
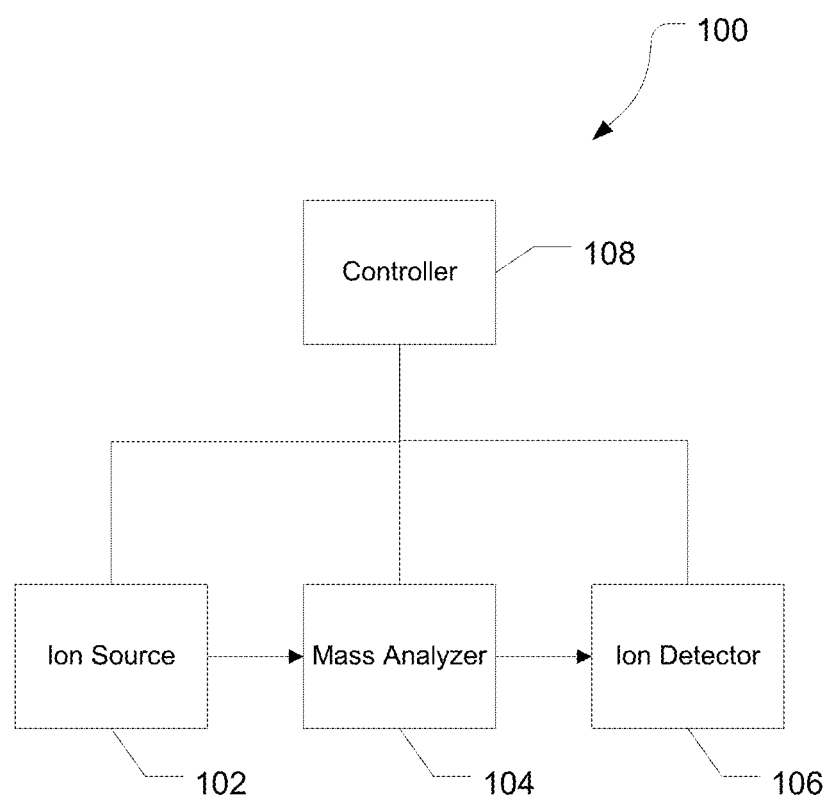
FIG. 1 is a block diagram of an exemplary mass spectrometry system, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 104 can separate ions based on a mass-to-charge ratio of the ions. For example, the mass analyzer 104 can include a quadrupole mass filter analyzer, a quadrupole ion trap analyzer, a time-of-flight (TOF) analyzer, an electrostatic trap (e.g., ORBITRAP) mass analyzer, Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source or enable/disable the ion source. Additionally, the controller 108 can configure the mass analyzer 104 to select a particular mass range to detect. Further, the controller 108 can adjust the sensitivity of the ion detector 106, such as by adjusting the gain. Additionally, the controller 108 can adjust the polarity of the ion detector 106 based on the polarity of the ions being detected. For example, the ion detector 106 can be configured to detect positive ions or be configured to detected negative ions.

Multilayer Insulation

Multilayer insulation (MLI) is a form of insulation used on satellites, space vehicles and cryogenic Dewars. MLI relies on vacuum conditions (typically less than $10^{-4}$ torr in pressure), as well as a plurality of low contact, low emissivity "shields" placed between a heat source, and a heat sink. The purpose of the vacuum condition is to minimize the heat loss mechanisms of convection and conduction, so that the primary heat loss mechanism is due to thermal radiation. The purpose of the low contact, low emissivity shields is to reflect as much as practical the thermal radiation back to the heat source. MLI is described for example in "Basic Investigations of Multi-layer Insulation Systems" NASA publication CR-54191 dated Oct. 30, 1964. Although MLI has been known for many years, it has not been widely used outside of the aerospace or cryogenic industries due to the necessity of a relatively high vacuum environment.

As described in the aforementioned publication, the heat exchange between any two parallel surfaces can be summarized in Equation 1.

$$Q = \sigma A (T_o^4 - T_i^4) \frac{1}{\frac{1}{e_0} + \frac{1}{e_i} - 1} \quad \text{Equation 1}$$

Q is the heat flow, σ is the Stephan-Boltzmann constant, A is the surface area, $T_o$ is the temperature of warm surface, $T_i$ is the temperature of cold surface, $e_o$ is the emissivity of warm surface, $e_i$ is the emissivity of cold surface.

As can be seen, for a given surface area and temperature difference, the heat exchange can be minimized by minimizing the emissivity of each surface.

The theoretical emittance from a series of N non-contacting layers of emissivity $e_1$ on one side and $e_2$ on the opposite side under vacuum conditions of $10^{-5}$ torr or less can be summarized in Equation 2.

$$e = \frac{1}{\frac{1}{e_i} + \frac{1}{e_2} - 1} \left( \frac{1}{N+1} \right) \quad \text{Equation 2}$$

As seen in this equation, low emissivity surfaces and high layer numbers result in the lowest overall emissivity and hence, lower thermal energy transfer.

Figure 2:
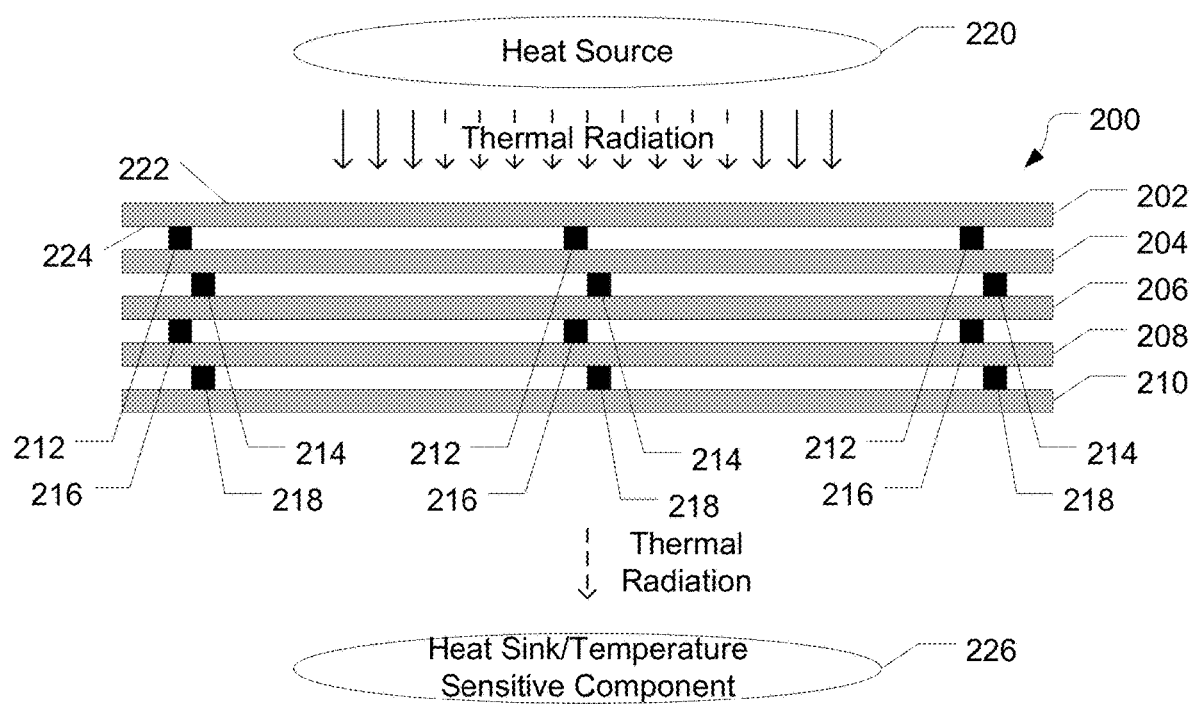
FIG. 2 is a block diagram illustrating a multilayer insulation, in accordance with various embodiments.

FIG. 2 is diagram illustrating a multilayer insulation 200. Multilayer insulation can include a plurality of layers 202, 204, 206, 208, and 210. Additionally, spacers 212, 214, 216, and 218 can be positioned to maintain the separation between the layers 202, 204, 206, 208, and 210. The separation distance can be insignificant in accordance with Equations 1 and 2 and the plates can be placed very close together to allow for multiple layers in a small space. However, direct contact between layers needs to be prevented. In various embodiments, the area between the layers can be fluidly connected to the rest of the vacuum chamber such that during operation, the area between the layers is also evacuated.

In various embodiments, layers 202, 204, 206, 208, and 210 can be thermally conductive. Layers 202, 204, 206, 208, and 210 can be sheets or plates of a metal such as aluminum. Alternatively, the layers 202, 204, 206, and 210 can be formed from a metalized polymer, such as a metalized polyester or a metalized polyimide.

In various embodiments, spacers 212, 214, 216, and 218 can be thermally insulating. It can be desirable to minimize the surface contact between the spacers and the layers, such as by using spherical spacers where the layers contact the spacer tangentially. Although other methods of reducing the contact between the spacers including altering the size and shape of the spacers are contemplated. Additionally, spacers 212, 214, 216, and 218 can be made from materials suitable for the temperature ranges needed, such as a ceramic, a high temperature polymer, for example polyimide, or other suitable material. It can be advantageous if the spacers do not undergo significant outgassing under vacuum and at elevated temperatures.

When operated under vacuum, the primary heat transfer mechanism can be via thermal radiation. Heat source 220 can emit thermal radiation towards the multilayer insulation 200. In various embodiments, layers 202, 204, 206, 208, and 210 can have a low surface emissivity and the surface 222 of layer 202 can reflect a majority of the thermal radiation back towards the heat source. However, a portion of the thermal radiation can still be absorbed by layer 202. As layer 202 heats, layer 202 will emit thermal radiation from surface 222 back towards the heat source and from surface 224 towards layer 204. Similarly, layers 204, 206, and 208 will reflect thermal radiation from the layers closer to the heat source while emitting thermal radiation due to heating from both surfaces. Layer 210 will reflect thermal radiation from layer 208 and emit thermal radiation due to heating back towards layer 208 and towards heat sink or temperature sensitive component 226.

Beneficially, as low emissivity layers will radiate only small amounts of energy to outer layers, there can be a significant reduction in the thermal radiation emitted from layer 210 towards heat sink or temperature sensitive component 226 compared to the thermal radiation emitted from heat source 220. By way of an example, if layers 202, 204, 206, 208, and 210 have an emissivity of 0.1, per Equation 2, e=0.00877 or just under 1% of the incident energy on layer 202 is emitted towards the heat sink or temperature sensitive component from layer 210. Additionally, most of the energy is reflected back towards the heat source 220 by layer 202. As such, the multilayer insulation can significantly reduce the energy needed to maintain heat source 220 at the desired temperature as well as significantly reducing the heating of temperature sensitive component 226.

Figure 3:
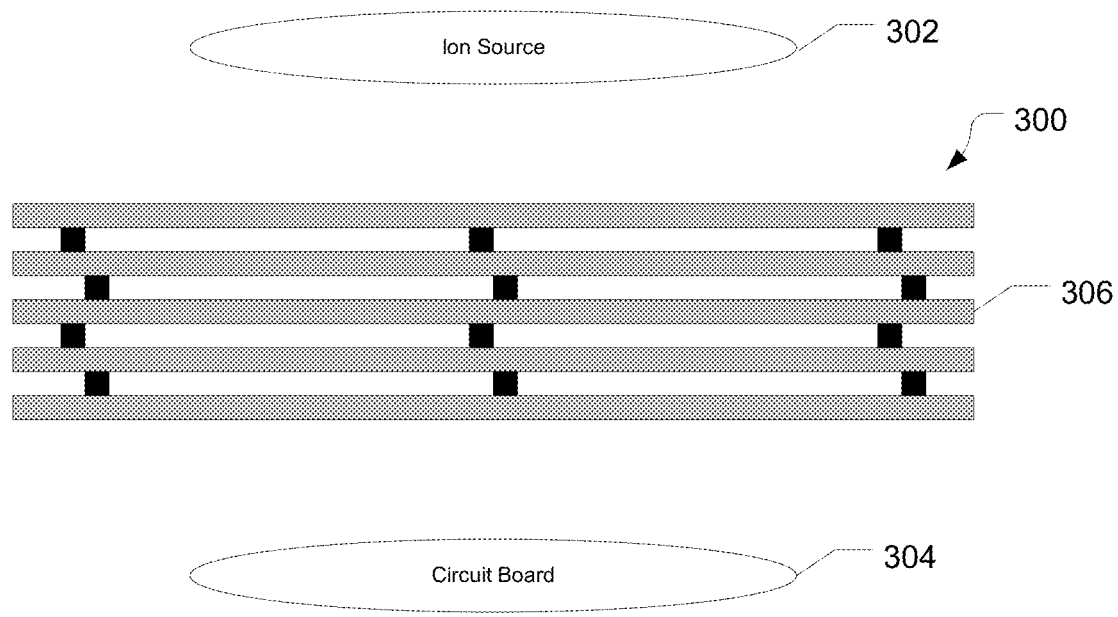
FIGS. 3-7 are diagrams illustrating exemplary mass spectrometer arrangements, in accordance with various embodiments.

Multilayer insulation can have a variety of uses in a mass spectrometer. FIG. 3 illustrates an arrangement 300 including an ion source 302, a circuit board 304, and a multilayer insulation 306. Ion source 302 can be an electron impact ionization source, a chemical ionization source, or other similar ion source. In various embodiments, ion source 302 can receive a heated gas flow from a gas chromatograph. To prevent condensation of compounds from the heated gas flow, the ion source 302 can be heated to maintain an elevated temperature, such as about 250 C or more. However, circuit board 304 can be sensitive to elevated temperature. Multilayer insulation 306 can significantly reduce the heat transfer between ion source 302 and circuit board 304, to prevent heat from ion source 302 from damaging the circuit board 304.

Figure 4:
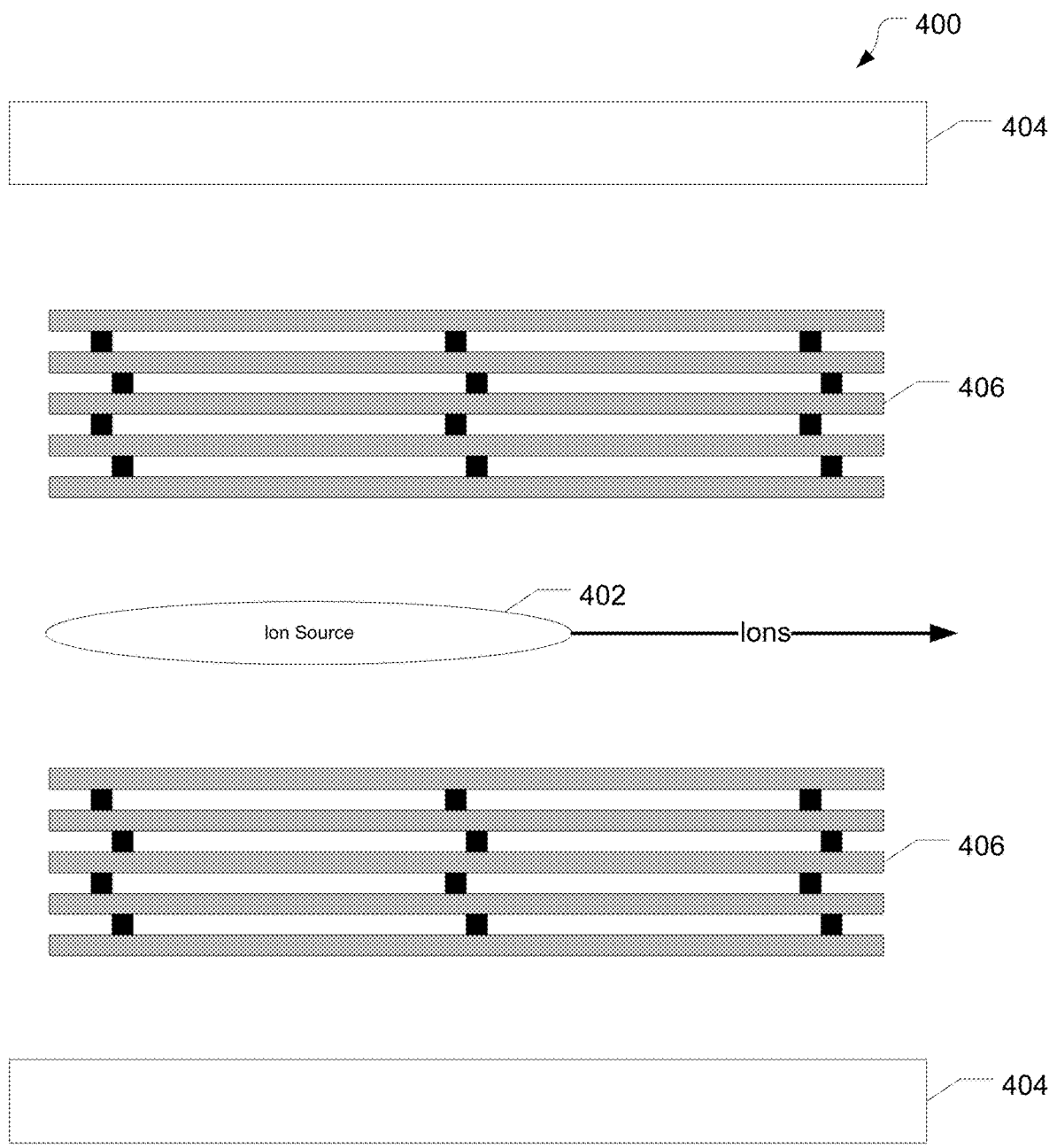

FIG. 4 illustrates an arrangement 400 including an ion source 402 within a vacuum manifold 404. Multilayer insulation 406 can be positioned between ion source 402 and vacuum manifold 404. Vacuum manifold 404 can have a large thermal mass and can be connected to the outside environment. As such, vacuum manifold 406 can act as a heat sink drawing heat away from the ion source. The use of the multilayer insulation 406 to reduce heat transfer from the ion source 402 to the vacuum manifold 404 can reduce the power needed to maintain the elevated temperature of the ion source 402.

Figure 5:
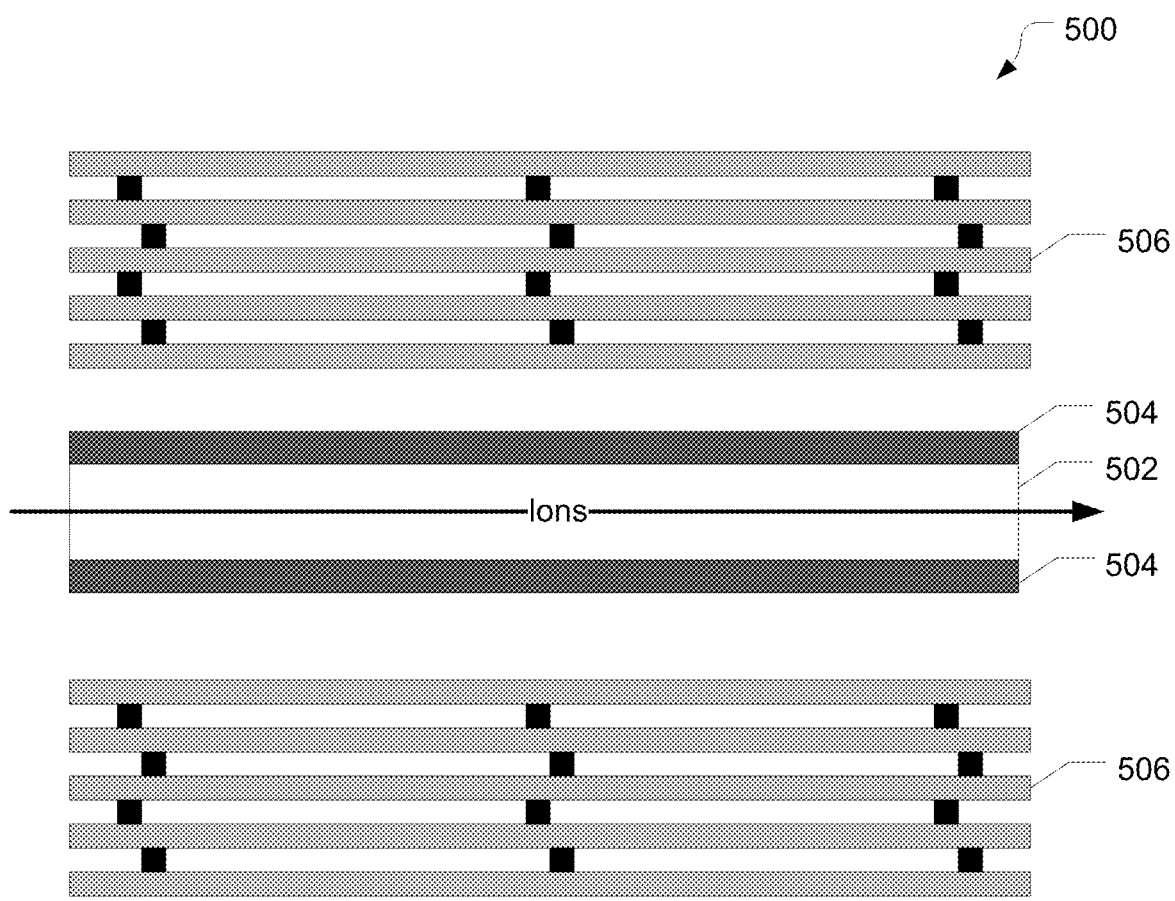

FIG. 5 illustrates an arrangement 500 including an ion transfer tube 502. In various embodiments, ion transfer tube 502 can provide a conduit between a higher pressure region, such as an electrospray source or an atmospheric pressure chemical ionization (APCI) source of a liquid chromatography-mass spectrometry (LC-MS) system. The ion transfer tube 502 can be surrounded by and heated by heater 504. The ion transfer tube 502 can be maintained at an elevated temperate to more fully desolvate ions or droplets drawn into the ion transfer tube 502 and to prevent condensation of materials on the internal surface of the ion transfer tube 502. Multilayer insulation 506 can be positioned around ion transfer tube 502 and heater 504 to reduce heat loss the power needed to maintain the elevated temperature of the ion transfer tube 502.

Figure 6:
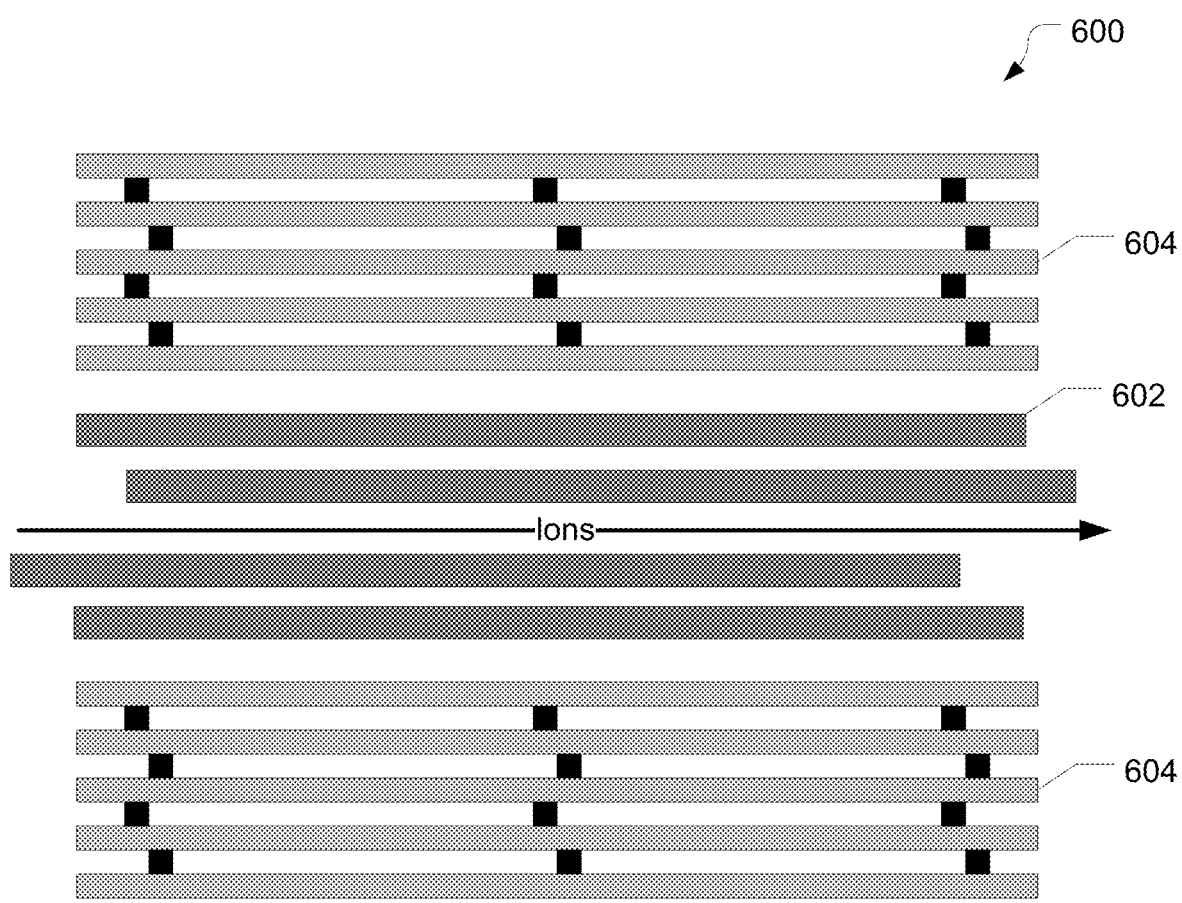

FIG. 6 illustrates an arrangement 600 including a multipole 602 such as an ion guide, mass filter, or ion trap. Multipole 602 utilizes RF fields, DC potentials, or any combination thereof to guide or select ions. Due to expansion and contraction of materials, changes in temperature can affect the geometry of the multipole 602, and thus alter performance. Thus, it can be advantageous to minimize changes in temperature such as by minimizing heat transfer into or out of multipole 602. Multilayer insulation 604 can be positioned around multipole 602 to minimize heat transfer and thus temperature fluctuations of multipole 602. Additionally, to maintain a constant temperature, multipole 602 could be actively heated or cooled, and the use of a multilayer insulation 604 can reduce the energy required to heat or cool multipole 602.

Figure 7:
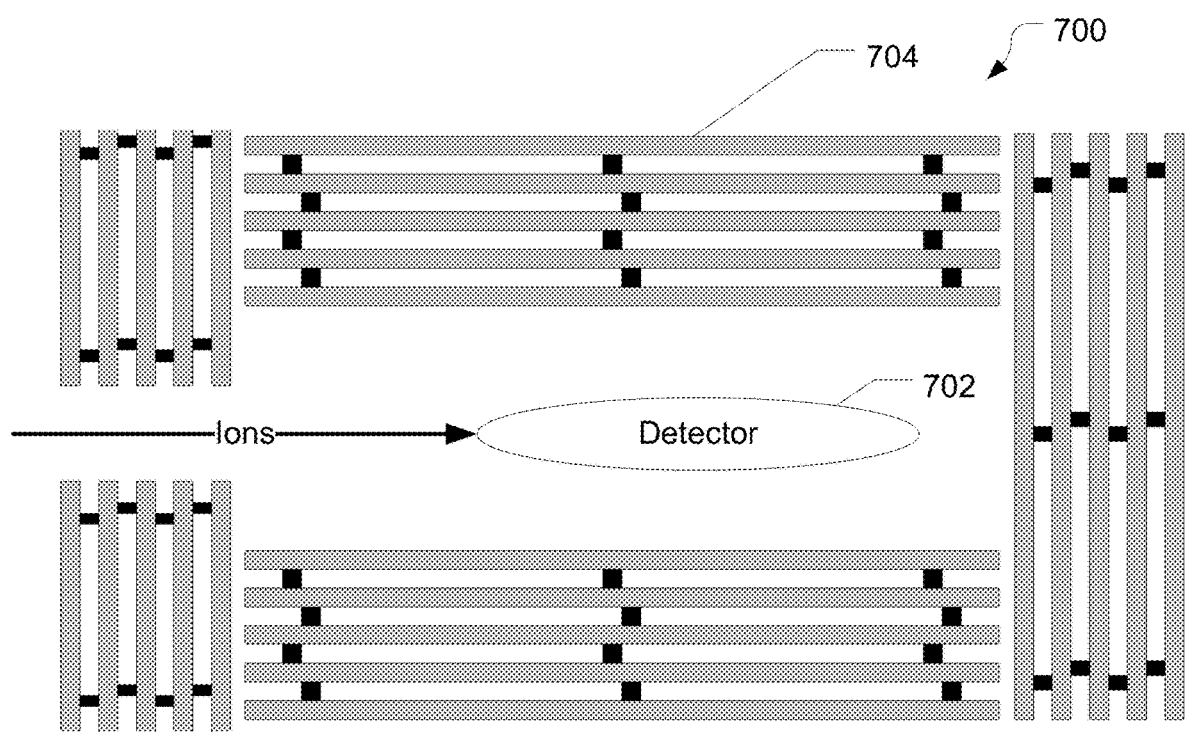

FIG. 7 illustrates an arrangement 700 including a detector 702. It can be desirable to reduce heating of the detector 702 to reduce thermal noise in the detector output. In various embodiments, multilayer insulation 704 can be positioned to surround detector 702 to prevent unwanted heating from high temperature regions of the mass spectrometer, such as an ion source. In further embodiments, detector 702 can be actively cooled, such as by piezoelectric cooling or circulation of a cooling liquid. Multilayer insulation 704 can reduce heat transfer into the detector 702 and/or can reduce the power needed to actively cool detector 702.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A mass spectrometer comprising:
   a vacuum manifold having an interior space;
   a vacuum pump configured to maintain the interior space at a pressure below $5 \times 10^{-5}$ torr;
   an ion source located within the interior space, the ion source configured to ionize a sample, the ion source including a heating element to maintain the ion source at an elevated temperature; and
   a multilayer insulator located within the interior space, the multilayer insulator comprising:
      an inner layer with a first surface oriented towards the ion source and a second surface oriented away from the ion source;
      an outer layer with a third surface oriented towards the ion source and a fourth surface oriented away from the ion source, the inner layer and the outer layer displaced apart from one another; and
      one or more spacers separating the inner layer and the outer layer.

2. The mass spectrometer of claim 1 further comprising one or more interior layers between the inner layer and the outer layer and displaced apart from one another and the inner and outer layers.

3. The mass spectrometer of claim 2 wherein the multilayer insulator further includes a plurality of spacers separating the inner layer, the outer layer and the one or more interior layers.

4. The mass spectrometer of claim 1 wherein the first surface has a low emissivity.

5. The mass spectrometer of claim 1 wherein the fourth surface has a low emissivity.

6. The mass spectrometer of claim 1 further comprising a temperature sensitive component separated from the ion source by the multilayer insulator, wherein the fourth surface is oriented towards the temperature sensitive component.

7. The mass spectrometer of claim 6 wherein the temperature sensitive component includes a printed circuit board.

8. A mass spectrometer comprising:
   a vacuum manifold having an interior space;
   a vacuum pump configured to maintain the interior space at a pressure below $5 \times 10$-5 torr;
   a heated component located within the interior space; and
   a multilayer insulator located within the interior space, the multilayer insulator comprising:
      an inner layer with a first surface oriented towards the ion source and a second surface oriented away from the heated component;
      an outer layer with a third surface oriented towards the heated component and a fourth surface oriented towards an interior surface of the vacuum manifold or other heat sink, the inner layer and the outer layer displaced apart from one another, and one or more spacers separating the inner layer and the outer layer.

9. The mass spectrometer of claim 8 further comprising one or more interior layers between the inner layer and the outer layer and displaced apart from one another and the inner and outer layers.

10. The mass spectrometer of claim 9 wherein the multilayer insulator further includes a plurality of spacers separating the inner layer, the outer layer and the one or more interior layers.

11. The mass spectrometer of claim 8 wherein the first surface has a low emissivity.

12. The mass spectrometer of claim 8 wherein the fourth surface has a low emissivity.

13. The mass spectrometer of claim 8 wherein the heated component includes an ion source, an ion guide, or an ion transfer tube.

14. A mass spectrometer comprising:
a vacuum manifold having an interior space;
a vacuum pump configured to maintain the interior space at a pressure below $5 \times 10^{-5}$ torr;
a heated component located within the interior space;
a temperature sensitive component located within the interior space and separated from the heated component by a vacuum; and
a multilayer insulator located between the heated component and the temperature sensitive component, the multilayer insulator comprising:
an inner layer with a first surface oriented towards the heated component and a second surface oriented towards the temperature sensitive component;
an outer layer with a third surface oriented towards the heated component and a fourth surface oriented towards the temperature sensitive component, the inner layer and the outer layer displaced apart from one another; and
one or more spacers separating the inner layer and the outer layer.

15. The mass spectrometer of claim 14 further comprising one or more interior layers between the inner layer and the outer layer and displaced apart from one another and the inner and outer layers.

16. The mass spectrometer of claim 14 wherein the multilayer insulator further includes a plurality of spacers separating the inner layer, the outer layer and the one or more interior layers.

17. The mass spectrometer of claim 14 wherein the first surface has a low emissivity.

18. The mass spectrometer of claim 14 wherein the fourth surface has a low emissivity.

19. The mass spectrometer of claim 14 wherein the temperature sensitive component includes a printed circuit board.

20. The mass spectrometer of claim 14 wherein the heated component includes an ion source, an ion guide, or an ion transfer tube.

* * * * *

UNITED STATES PATENT AND TRADEMARK OFFICE
CERTIFICATE OF CORRECTION

PATENT NO. : 11,069,518 B2  
APPLICATION NO. : 16/587585  
DATED : July 20, 2021  
INVENTOR(S) : Edward B. McCauley et al.

Page 1 of 1

It is certified that error appears in the above-identified patent and that said Letters Patent is hereby corrected as shown below:

On the Title Page

Item (57) Abstract:  
Replace "below 5×10-5"  
With --below $5\times10^{-5}$--

In the Claims

Claim 8, Column 8, Line 56:  
Replace "below 5×10-5"  
With --below $5\times10^{-5}$--

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*